(12) United States Patent
Zeibig et al.

(10) Patent No.: US 6,702,098 B2
(45) Date of Patent: Mar. 9, 2004

(54) DEVICE TO FEED WORK PIECES USING GRIPPING RAILS

(75) Inventors: Uwe Zeibig, Achern (DE); Klemens Nock, Oberkirch (DE)

(73) Assignee: Erdrich Beteiligungs GmbH, Renchen-Ulm (DE)

( * ) Notice: Subject to any disclaimer, the term of this patent is extended or adjusted under 35 U.S.C. 154(b) by 0 days.

(21) Appl. No.: 10/368,832

(22) Filed: Feb. 19, 2003

(65) Prior Publication Data

US 2003/0183485 A1 Oct. 2, 2003

(30) Foreign Application Priority Data

Feb. 19, 2002 (DE) .......................... 102 06 773

(51) Int. Cl.$^7$ ............................................. B65G 47/00
(52) U.S. Cl. .................. 198/468.2; 198/468.9
(58) Field of Search ............... 198/468.2, 817, 198/465.1, 466.1, 465.4, 468.6, 468.9, 468.11, 773, 774.3, 468.01

(56) References Cited

U.S. PATENT DOCUMENTS

| | | | |
|---|---|---|---|
| 4,192,169 A | | 3/1980 | Munch et al. |
| 5,004,093 A | * | 4/1991 | Blezard ................. 198/468.2 |
| 5,368,643 A | * | 11/1994 | Kuster .................... 198/817 |
| 6,170,641 B1 | * | 1/2001 | Kuster ................ 198/468.2 |
| 6,193,049 B1 | * | 2/2001 | Noda ................... 198/468.2 |
| 6,216,523 B1 | | 4/2001 | Sofy et al. |

FOREIGN PATENT DOCUMENTS

| | | |
|---|---|---|
| DE | 100 19 109 A1 | 10/2001 |
| EP | 0 633 077 B1 | 1/1995 |

* cited by examiner

Primary Examiner—James R. Bidwell
(74) Attorney, Agent, or Firm—Volpe and Koenig, P.C.

(57) ABSTRACT

A device (1) to feed work pieces in steps, for example within a press (2), using two gripping rails (3) that can be moved back and forth in the feed direction, that includes at least one feed traverse (8) that moves perpendicular to itself with which to uniformly feed and return the gripping rails (3). Coupled to this traverse is at least one tilt arm (9) that is driven by a servomotor (11) whose tilt motion is converted to the perpendicular motion of the feed traverse (8) and thus into the feed and return motion of the gripping rails (3). There can also be two tilt arms (9) arranged in a mirror-image fashion.

9 Claims, 5 Drawing Sheets

DEVICE TO FEED WORK PIECES USING GRIPPING RAILS

This application claims the right of priority from DE 102 06 773.2, filed Feb. 19, 2002, which is incorporated herein by reference as if fully set forth.

BACKGROUND

This invention pertains to a device for stepwise feeding of work pieces using two gripping rails that can be moved back and forth in the feed direction, with the gripping rails having gripping parts or gripping zones with which to grasp the work pieces. To grasp the work pieces and move them in the feed direction, these gripping rails can be moved and then returned to their starting position, wherein there are at least two levers attached to each gripping rail at a distance from one another that tilt parallel to one another in the plane of motion of the gripping rails or in a plane parallel to it or a mirror image thereof, and wherein the levers of one gripping rail tilt in the opposite direction to those of the other gripping rail, said levers being coupled to their respective rails via a longitudinal guide extending in the direction of orientation of the gripping rails.

A prior art device of this type is known from EP 0 633 077 B1 that can be used in stamping presses as described in DE 100 19 109 A1, and its usefulness has been proven since it requires minimal design height, particularly in the grip zone, and since it saves space and simplifies the synchronization of the motions of the levers. Nevertheless, the synchronization of the motions of the levers in this known device requires a mechanical connection, and the gripping rails travel along a pull and/or push bar in their longitudinal direction of extension, which produces this mechanical connection and provides for the synchronous motion of the levers. In addition, to accomplish a uniform feed motion, a relatively expensive gear design is required in order to coordinate the gripping motions, the feed motions and the return motions in time with one another.

SUMMARY

Therefore, the object is to create a device of the type mentioned above in which the mechanical complexity can be reduced; in particular the complexity of the uniform feed motion can be reduced.

In order to meet this objective, the device defined above is characterized in that to produce the feed and return motion, at least one feed transverse directly or indirectly attaches to the gripping rails outside of their gripping zones, said traverse moving perpendicular to itself, that at least one driven tilt arm is connected to this feed traverse whose tilting motion can be converted into a feed motion of the feed traverse perpendicular to itself and thus into a feed motion and return motion, respectively, of the gripping rails, wherein the point of attachment of the tilt arm slides within a longitudinal guide running in the direction of orientation of the feed traverse, that a servomotor is provided as the drive unit for the tilting motion, and that means are provided to guide the feed motion of the feed traverse perpendicular or parallel to itself.

Using servomotors, mechanical transmission means such as gears, cam plates and the like can be eliminated, i.e. bodies of considerable mass that are accelerated and braked as the device is actuated. Moreover, the mechanical complexity is considerably reduced.

An embodiment of the invention that meets this criteria comprises at least one mechanical guide, for example at least one guide track, guide profile, guide rail or guide bar, that is provided to guide the feed and return motion of the traverse perpendicular to itself, at least one guide member or guide element that is present at the feed traverse or connected to the traverse and that engages the mechanical guide, or that at least one guide is provided on the feed traverse that runs perpendicular to the direction in which it extends and that cooperates with at least one fixed guide member or guide element. Preferably in this regard, there are two parallel guide rails or guide bars. This makes it possible for a single tilt arm driven by a servomotor to be sufficient to move the feed traverse perpendicular to itself, thus resulting in the feed and return motion of the gripping rails.

A preferred embodiment of the invention can be characterized in that as a means to guide the feed traverse perpendicular or parallel to itself, a second tilt arm driven by a servomotor engages the traverse and that is approximately a mirror-image of the first tilt arm and that has the same dimensions, the tilt motion of said second tilt arm being transformed, together with that of the first tilt arm, into the feed and return motion of a corresponding feed traverse, respectively, or of a common feed traverse, and thus into the feed and return motion of the gripping rails, wherein the point of attachment of this second tilt arm slides within a longitudinal guide that runs in the direction of orientation of the associated feed traverse. In the same way that the gripping rails themselves can be moved synchronously toward and away from one another by means of levers that are placed approximately mirror-imaged with respect to one another, they can also be moved in the feed and return direction via a common feed traverse, or if necessary by two separate feed traverses, and two oppositely rotating tilt arms attached to it/them of equal size and driven by means of servomotors. This provides a simple mechanical design with few parts to be accelerated. For precise motions, an additional mechanical guide can also be provided in this case.

In the process, the driven shaft of each servomotor can be directly coupled to the tilt axis of its respective tilt arm or arms, or the shaft can constitute this axis—in particular as a single piece. The motion of the servomotor can thus be directly transmitted into the tilt motion of the respective tilt arm so that no additional translations or transmissions of force are necessary to move the feed traverse. The mechanical complexity is thus correspondingly low.

The feed traverse can penetrate guide notches or guide openings that run along or through the gripping rails perpendicular to the gripping rails, and the gripping rails can move perpendicular relative to the feed traverse in its longitudinal direction as they open and close. In this way, the gripping rails can execute their opening and closing motions and can also still be moved in the feed direction and reverse with the help of the feed traverse.

A modified additional embodiment provides that guide fingers or the like which slide along the feed traverse in its direction of orientation are placed in slots, for example, to couple the feed traverse to the gripping rails, said guide fingers extending from the feed traverse outward into matching recesses in the gripping rails.

Another configuration is made possible by placing the tilting levers used to move the gripping rails above and/or below the gripping rails, and by placing the feed traverse and its tilt arm below and/or above the gripping rails, since the latter are located outside of the gripping zone and thus also away from the press tools.

The levers that operate the gripping rails can also each have a servomotor as a drive system for its tilt motions and the servomotors of the tilting levers for the gripping rails and those of the tilt arm or arms for the feed traverse can have a common control system that matches their tilt motions to one another, in particular temporally. By using servomotors for the drive system of multiple, or if possible for all tilt arms, the matching of the individual motions to one another can be carried out by means of a control system, specifically electrical or electronic, and preferably programmable, which requires considerably less mechanical complexity than a mechanical coordination system via gears.

The 'tilting ends of the tilt levers and the tilt arms can each attach to glide blocks that slide within slots in the gripping rails and in the feed traverse. This results in a direct and ideal connection of the tilting levers and the tilt arm to parts that move only in straight lines so that the tilt motions can be converted practically unfettered into corresponding straight motions.

Primarily through the combination of one or more of the features and measures described above, a device results of the type mentioned at the outset in which the previously required mechanical transmission means such as gears and cam plates, i.e. bodies of considerable mass that must be accelerated and braked when actuating the device, can be done away with.

BRIEF DESCRIPTION OF THE DRAWINGS

Exemplary embodiments of the invention are explained in more detail below with the help of the drawing.

Shown in schematic representation are.

DETAILED DESCRIPTION OF THE PREFERRED EMBODIMENTS

In the exemplary embodiments described below, parts in different design configurations that are similar, or similar in function, are identified with the same reference number.

A device, identified in its entirety as 1, is used to feed work pieces in steps, for example inside of a press 2 that is shown only partially, in which each work piece is subjected to an additional processing step after a feed motion or feed step.

Figure 1:
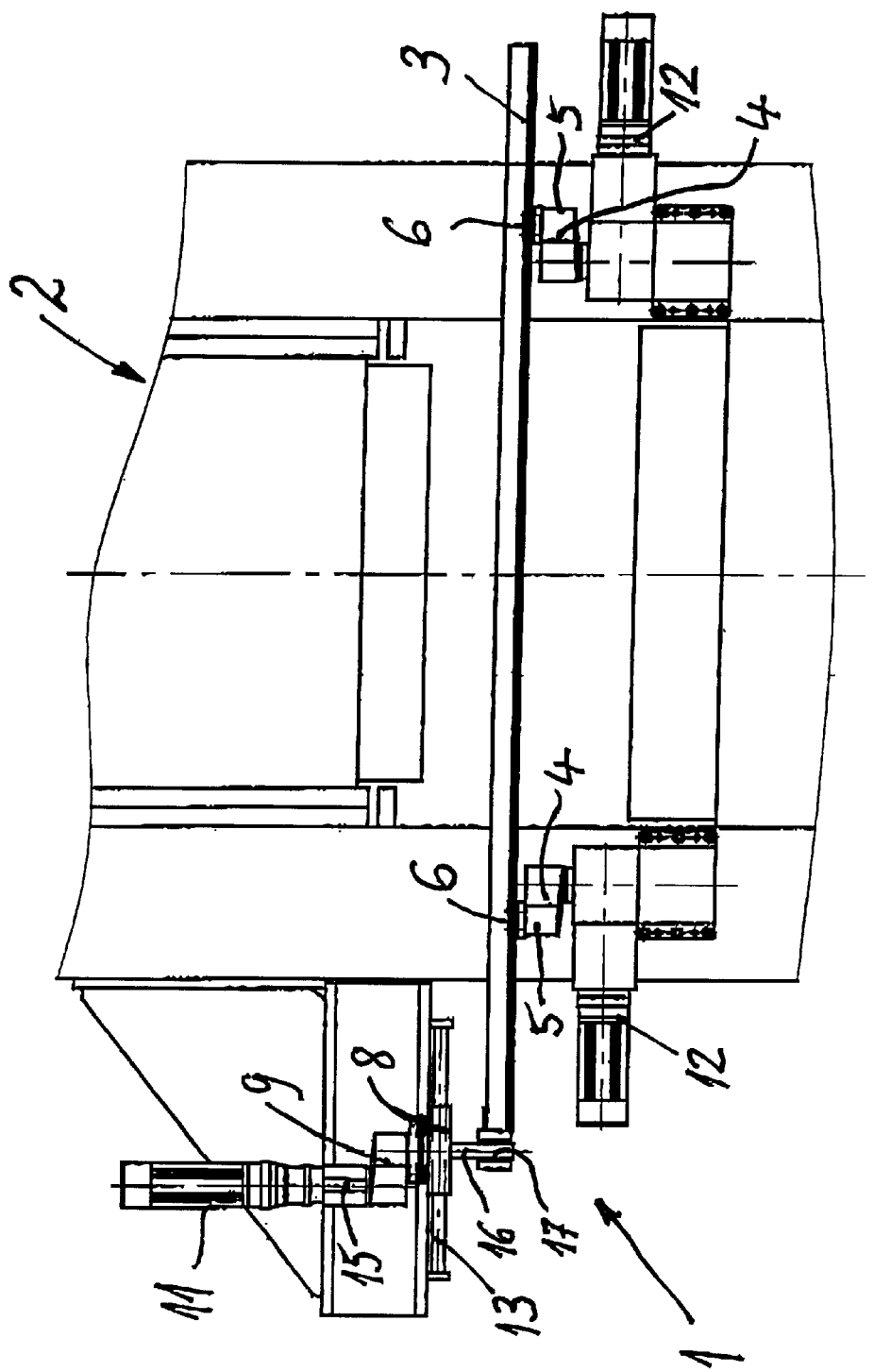
FIG. 1 a view of a press shown only partially, and incomplete, in which a device according to the invention for stepwise feeding of work pieces is placed, said device being shown in a side view, wherein the part of the gripping rails to grasp the work pieces is provided inside of the press and a drive system for the feeding of the gripping rails is provided outside the press fastened to it, FIG. 2 a top view of the arrangement according to FIG. 1, wherein the stands of the press or similar working machine can be seen in cross section, and tilting levers for the motions of the gripping rails are mounted on these stands, and wherein a tilt arm is also provided for the feed and the return motion of the gripping rails, FIG. 3 a front view of the arrangement according to FIGS. 1 and 2 approximately in the feed direction with a view of a tilt arm driven by a servomotor and of a feed traverse that it operates to move the gripping rails in the direction of their longitudinal extension, FIG. 4 a representation according to FIG. 2 with two tilt arms, each driven by a servomotor, that connect to a uniform feed traverse with which to move the gripping rails in the direction of their longitudinal extension and that are of equal size but are placed in a mirror-image arrangement with respect to the longitudinal centerline between the gripping rails, and FIG. 5 a representation according to FIG. 3 with a view of the two mirror-imaged tilt arms that connect to a uniform feed traverse and that are each driven by a servomotor.
Figure 2:
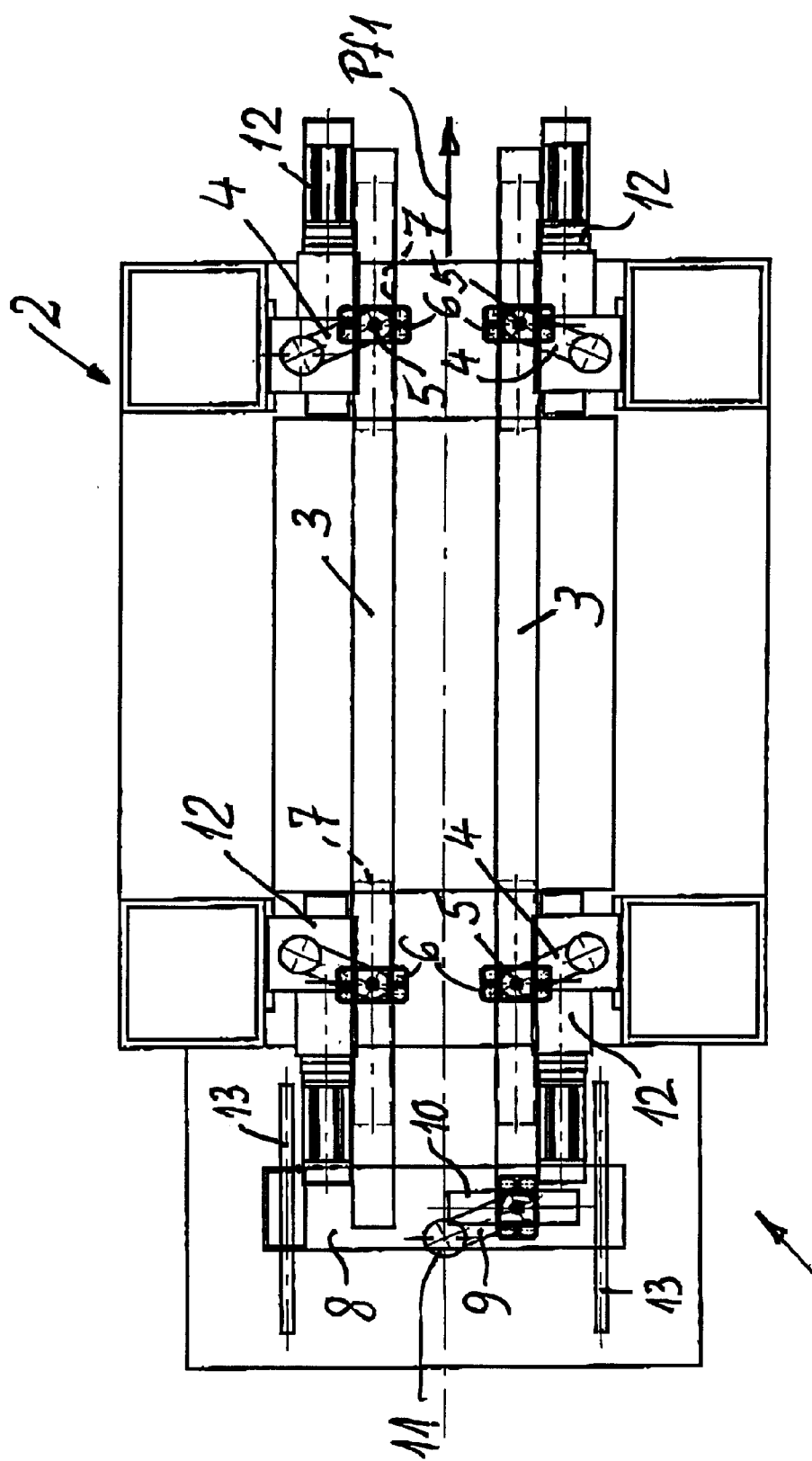
Figure 4:
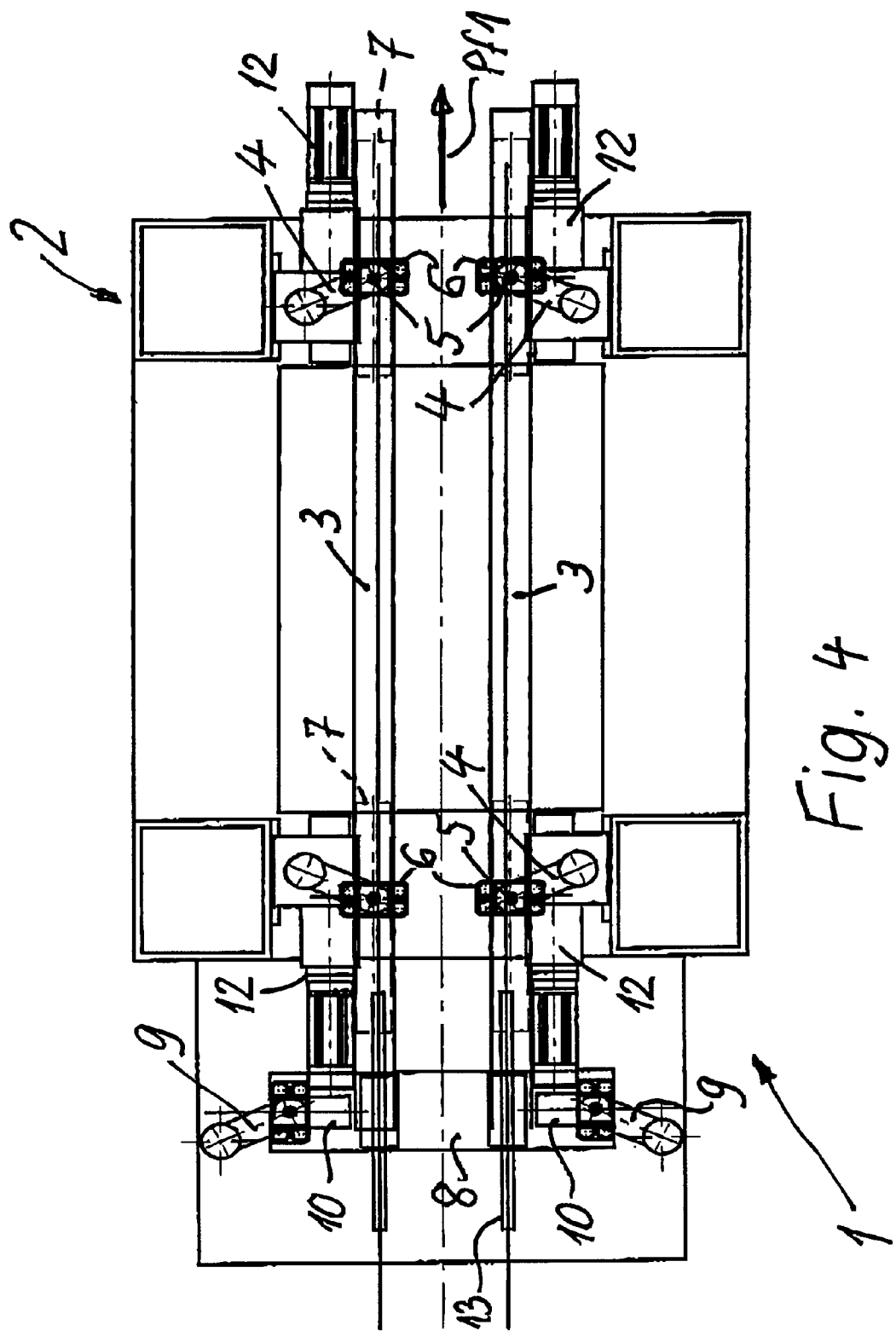

To this end, the device 1 has two parallel gripping rails 3 that move in the feed direction, which is shown by the arrow PF1 in FIG. 2 and FIG. 4, and that can be pulled back again. Gripping members or gripping zones are attached to these gripping rails with which to grasp the work pieces in a manner that is known and therefore not shown in more detail.

The gripping rails 3 are allowed to move toward one another to grasp such work pieces, and back away from one another to release them, in other words the gripping rails 3 each make four motions, namely a gripping motion, in which the gripping rails 3 move toward one another, a feed motion in the direction of arrow PF1, a opening motion opposite to the gripping motion and a return motion back to its initial position opposite to the feed motion. In the process, the gripping rails 3 are moved toward one another to grasp the work pieces and then together in the feed direction to feed the work pieces, and then are moved away from one another again and finally back together to their initial position.

Figure 3:
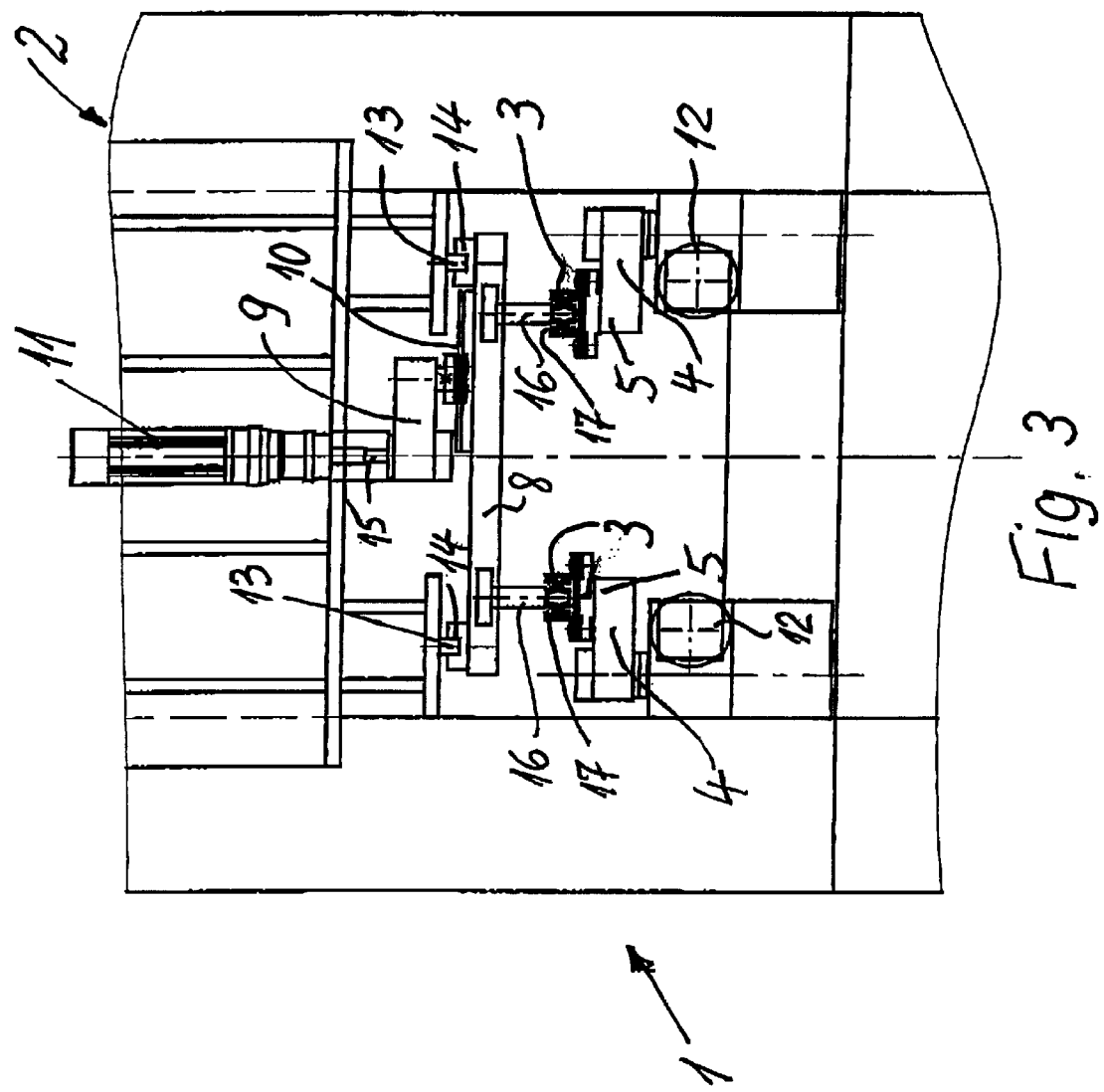
Figure 5:
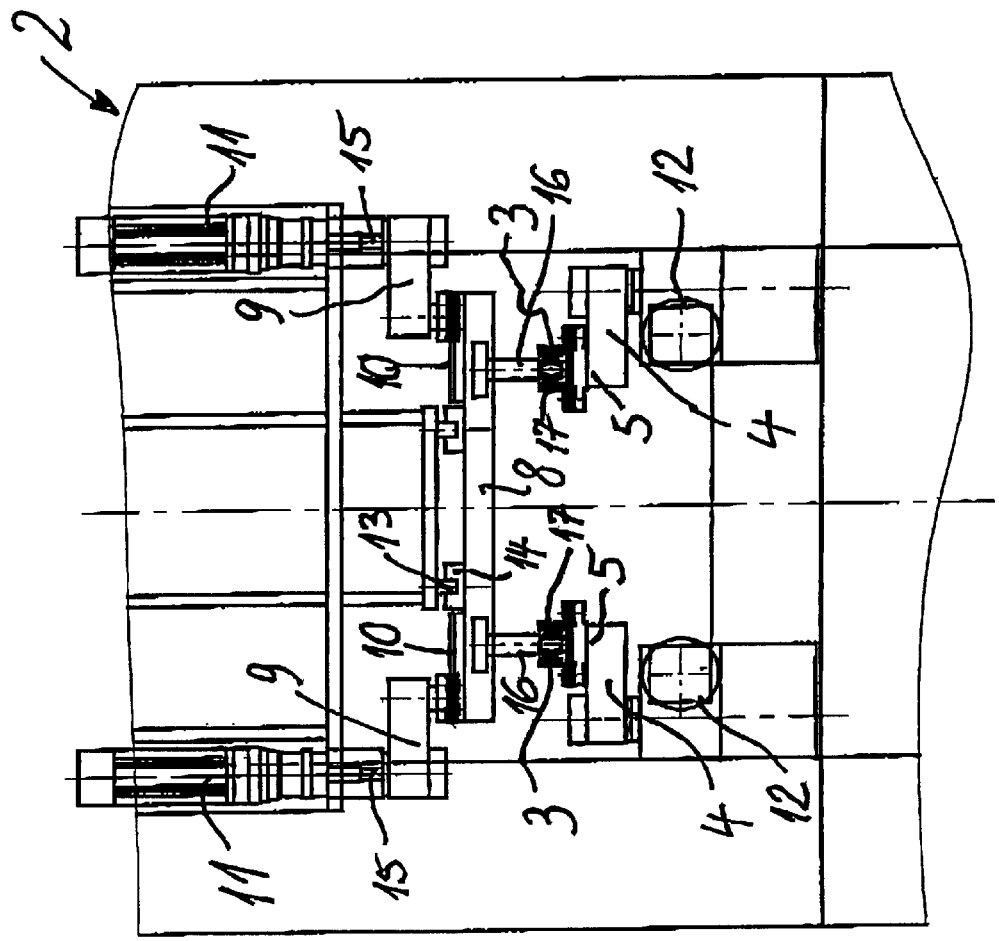

For these various motions, each gripping rail 3 is held by the tilting ends 5 or end regions of two levers 4 that tilt synchronously in a mirror-image of one another in the plane of motion of the gripping rails, or in a plane parallel to it, as can be seen primarily in FIGS. 3 and 5, but also in the remaining figures.

The levers 4 of one gripping rail 3 tilt in the opposite direction to those of the other gripping rail 3 so as to move the two gripping rails 3 either toward or away from one another. So as to carry out these motions largely independent of the feed motion, each of the levers 4 is coupled to a respective longitudinal guide 7 on the gripping rails 3 via a glide element 6. This allows the gripping rails 3 to also move in the feed direction or in the direction opposite to it relative to the points where the ends 5 of the levers 4 are hinged, as is also described in EP 0 633 077 B1.

In both exemplary embodiments, a feed traverse 8 is provided at the gripping rails 3 outside of their gripping zones in a manner yet to be described to provide for the uniform feed and return movement of the gripping rails 3, with the feed traverse moving perpendicular to its longitudinal extension, and capable of being directly or indirectly connected to the gripping rails 3.

According to the exemplary embodiment shown in FIG. 2 and 3, a driven tilt arm 9 is connected to this feed traverse 8, and according to the exemplary embodiment of FIG. 4 and 5 two such tilt arms 9 are connected to it. The tilt motion of the tilt arms is converted to a feed motion of the feed traverse 8 perpendicular or parallel to itself in a manner yet to be described, which then imparts a feed motion and a return motion to the gripping rails 3, accordingly. The point of connection of the tilt arm or arms 9 slides within a longitudinal guide 10 that runs in the direction of orientation of the feed traverse 8, with additional means being provided—which are yet to be described—to guide the feed motion of the feed traverse 8 perpendicular or parallel to itself.

A servomotor 11 is provided as a drive system for the tilt motion of each of the tilt arm or arms 9 that drive the feed traverse 8, similar to the use of servomotors 12 to drive the tilting levers 4.

In both exemplary embodiments, the means just mentioned to guide the feed and return motion of the feed traverse 8 perpendicular to itself is a mechanical guide made up of a guide bar 13 oriented in the feed direction and a guide track 14 that holds it, wherein in the exemplary embodiment according to FIGS. 2 and 3, these mechanical guides are placed near the ends of the feed traverse 8 and in the exemplary embodiment according to FIGS. 4 and 5 they are placed more near the center of the feed traverse 8.

In comparison with the exemplary embodiment according to FIGS. 2 and 3, the second tilt arm 9 provided in the exemplary embodiment according to FIGS. 4 and 5 and driven by a servomotor 11 could also be used as a sole means to move the feed traverse 8 perpendicular or parallel to itself, with the second tilt arm acting on the feed traverse 8 as a mirror-image to the first tilt arm 9 and with equal dimensions. In the exemplary embodiment according to FIGS. 4 and 5, two such tilt arms 9 are each provided with a servomotor 11 as a drive unit, and their mirror-imaged tilt motions are converted to the feed and return motion already described of the uniform feed traverse 8 and thus of the gripping rails 3 that it drives, wherein the points of connection of these tilt arms 9 slide within longitudinal guides 10 that extend in the direction of orientation of the feed traverse 8. However, in this case, the mechanical guide already described is provided in addition to provide for precise movement.

It should be noted that each gripping rail 3 could be provided with its own "feed traverse" when using two tilt arms 9, but that a single feed traverse 8 improves the mutual guidance and precision of the various motions.

In all exemplary embodiments, one can see that the driven shaft 15 of each servomotor 11 is coupled to the respective tilt axis of its associated tilt arm 9 in a shape lock or can constitute the axis by itself as one piece. In this way, the power from the servomotor 11 can be transmitted directly to its associated tilt arm 9, in particular via an intermediate gear, which leads to a correspondingly simple design and to the least possible amount of play.

To transmit the perpendicular motion of the feed traverse 8 to the gripping rails 3, this feed traverse 8 could penetrate guide notches or guide openings that run perpendicular to the gripping rails 3 along or through them. This allows the gripping rails to move perpendicular relative to the feed traverse in its longitudinal direction as they open and close.

In the exemplary embodiments, however, guide fingers 16 or similar projections are located on the feed traverse 8 that slide along its direction of orientation, for example within slots, to couple the feed traverse 8 to the gripping rails 3, with the guide fingers extending out from the feed traverse 8 into matching recesses 17 in the gripping rails 3. In this way, the feed traverse 8 and the gripping rails 3 are located in planes that are parallel to one another and that are bridged by means of the guide fingers 16 or similar projections.

In FIGS. 3 and 5, it can be seen that the working position of the tilting levers 4 to move the gripping rails 3 is beneath the gripping rails 3 and the feed traverse 8 and its tilt arm 9 are located above the gripping rails 3 or above the plane in which the gripping rails 3 lie. This allows for good utilization of space within a press 1.

As already mentioned, the levers 4 that drive the gripping rails 3 each have a servomotor 12 to drive their tilt motions, and tilt arm 9 also has a servomotor 11. This makes it possible for the servomotors 12 of the tilting levers 4 and the servomotor or motors 11 for the feed traverse 8 to have a common control system that matches their tilt motions to one another, or coordinates them, in particular temporally. This results in a very simple overall matching and synchronization of the individual motions of the gripping rails 3 described above without requiring a complicated mechanical gear for this purpose.

In an advantageous manner, the servomotors 11 and 12, less their gears, can be of identical designs. This contributes to streamlining and to a reduction of costs.

The tilting ends of the tilting levers 4 and tilt arms 9 can each connect to slide blocks that fit and slide within slots in the gripping rails 3 and in the feed traverse 8 so as to convert the corresponding tilt motions into straight motions in a known fashion.

The device 1 to feed work pieces in steps, for example inside of a press 2, with two gripping rails 3 that move back and forth in the feed direction has at least one feed traverse 8 that moves perpendicular to its longitudinal orientation for the uniform feed and return motion of the gripping rails 3, with at least one tilt arm 9 coupled to the feed traverse that is driven by a servomotor 11, with the tilt motion of the tilt arm being converted into the perpendicular motion of the feed traverse 8 and thus into the feed and return motion of the gripping rails 3. Two tilt arms 9 can also be provided that are arranged in a mirror-imaged fashion.

What is claimed is:

1. A device (1) to feed work pieces in steps comprising two gripping rails (3) that can be moved back and forth in a feed direction, said gripping rails having gripping parts or gripping zones with which to grasp the work pieces, said gripping rails, in order to grasp the work pieces and move them in the feed direction, are able to be moved and then returned to a starting position, wherein there are at least two levers (4) attached to each of the gripping rails (3) at a distance from one another that tilt parallel or in a mirror-image fashion with respect to one another in a plane of motion of the gripping rails or in a plane parallel there to, and wherein the levers (4) of one of the gripping rails (3) tilt in an opposite direction to those of the other of the gripping rails (3), said levers being coupled to the respective rails via a longitudinal guide (7) that extends in a direction of orientation of the gripping rails (3), wherein to produce the feed and return motion, at least one feed traverse (8) directly or indirectly attaches to the gripping rails (3) outside of the gripping zones, said traverse feed moving in a direction perpendicular to a longitudinal orientation thereof, at least one driven tilt arm (9) is connected to the feed traverse (8) having a tilting motion that can be converted into a feed motion of the feed traverse (8) perpendicular to the orientation thereof and thus into the feed motion and return motion, respectively, of the gripping rails (3), wherein a point of attachment of the tilt arm (9) slides within a longitudinal guide (10) extending in the direction of orientation of the feed traverse (8), a servomotor (11) is provided as a drive unit for the tilting motion of the tilt arm (9), and means are provided to guide the feed motion of the feed traverse (8) perpendicular or parallel to itself.

2. A device according to claim 1, wherein to guide the feed and return motion of the feed traverse (8) perpendicular to the orientation thereof, at least one mechanical guide comprising at least one guide track, guide profile, guide rail or guide bar that is held by at least one guide member or guide element that is present at the feed traverse (8) or that at least one guide is provided on the feed traverse (8) that extends perpendicular to the direction in which the feed traverse extends, i.e. in a direction of orientation of the gripping rails (3), and that cooperates with at least one fixed guide member or guide element.

3. A device according to claim 1, wherein a second tilt arm (9) engages the feed traverse (8) that is driven by a servomotor (11) and that is approximately a mirror-image of the first tilt arm (9) and that has the same dimensions, the tilt motion of said second tilt arm being transformed, together with that of the first tilt arm (9), into the feed and return motion of a corresponding feed traverse (8), respectively, or of a common feed traverse (8), and thus into the feed and return motion of the gripping rails (3), wherein a point of attachment of the second tilt arm (9) also slides within a longitudinal guide (10) that extends in the direction of orientation of the associated feed traverse (8).

4. A device according to claim 3, wherein a driven shaft (15) of the servomotor (11) is directly coupled to the tilt axis of the tilt arm or arms (9), or the shaft constitutes the tilt axis.

5. A device according to claim 1, wherein the feed traverse (8) penetrates guide notches or guide openings that extend along or through the gripping rails (3) perpendicular thereto, and the gripping rails (3) move perpendicular relative to the feed traverse in a longitudinal direction as they open and close.

6. A device according to claim 1, wherein guide fingers (16), which slide along the feed traverse (8) in a direction of orientation thereof, are placed in slots to couple the feed traverse (8) to the gripping rails (3), said guide fingers extending from the feed traverse (8) outward into matching recesses (17) in the gripping rails (3).

7. A device according to claim 1, wherein the tilting levers (4) used to move the gripping rails (3) are placed above and/or below the gripping rails (3), and that the feed traverse (8) and the tilt arm (9) are placed below and/or above the gripping rails (3).

8. A device according to claim 1, wherein the levers (4) that operate the gripping rails (3) each have a servomotor (12) as a drive system for tilt motions thereof and that the servomotors (12) of the tilting levers (4) for the gripping rails and the servomotor (11) of the tilt arm or arms for the feed traverse (8) have a common control system that matches tilt motions to one another.

9. A device according to claim 1, wherein tilting ends of the tilt levers (4) and the tilt arm or arms (9) each attach to glide blocks that slide within slots in the gripping rails (3) and in the feed traverse (8).

* * * * *